(12) United States Patent
Barbat

(10) Patent No.: US 12,434,064 B2
(45) Date of Patent: Oct. 7, 2025

(54) INDUCTIVE CHARGING COIL CONFIGURATION FOR AN IMPLANTABLE MEDICAL DEVICE

(71) Applicant: Greatbatch Ltd., Clarence, NY (US)

(72) Inventor: Gabriel Amilcar Barbat, Ciudad de la Costa (UY)

(73) Assignee: Greatbatch Ltd., Clarence, NY (US)

(*) Notice: Subject to any disclaimer, the term of this patent is extended or adjusted under 35 U.S.C. 154(b) by 568 days.

(21) Appl. No.: 17/878,330

(22) Filed: Aug. 1, 2022

(65) Prior Publication Data

US 2023/0032945 A1 Feb. 2, 2023

Related U.S. Application Data

(60) Provisional application No. 63/227,481, filed on Jul. 30, 2021.

(51) Int. Cl.
*A61N 1/378* (2006.01)
*A61B 5/00* (2006.01)
(Continued)

(52) U.S. Cl.
CPC .......... *A61N 1/3787* (2013.01); *A61B 5/0022* (2013.01); *A61N 1/05* (2013.01);
(Continued)

(58) Field of Classification Search
CPC ............ A61N 1/37205; A61N 1/37229; A61N 1/3756; A61N 1/3758
See application file for complete search history.

(56) References Cited

U.S. PATENT DOCUMENTS 7,640,061 B2 * 12/2009 He .................... A61N 1/37205
361/679.01
8,634,928 B1 1/2014 O'Driscoll et al.
(Continued)

FOREIGN PATENT DOCUMENTS

WO 2021003439 A1 1/2021

OTHER PUBLICATIONS

"Extended European Search Report, Application No. 22188175.8, dated Dec. 2, 2020."

*Primary Examiner* — George R Evanisko
(74) *Attorney, Agent, or Firm* — Michael F. Scalise

(57) ABSTRACT

An active implantable medical device (AIMD) is described. The AIMD has a rechargeable electrical energy power source connected to a PCB assembly for powering the medical device. The AIMD can sense biological signals from a patient, or it can have at least two electrodes that provide stimulation therapy to the patient. An inductive charging coil housed inside an elongate device enclosure is connected to the power source. The inductive charging coil has winds of an electrically conductive wire or tape that wrap around the PCB. The winds of the inductive charging coil have an upper wind portion residing above the PCB and a lower wind portion below the PCB. Opposed curved ends of the inductive charging coil winds are continuous with the upper and lower wind portions. This structure provides the inductive charging coil with a length aligned along a longitudinal axis of the PCB. In that manner, the inductive charging coil occupies a space otherwise not used in an elongate cylindrical enclosure for an AIMD.

21 Claims, 10 Drawing Sheets

(51) Int. Cl.
  *A61N 1/05*   (2006.01)
  *H02J 50/12*  (2016.01)
  *H02J 50/90*  (2016.01)

(52) U.S. Cl.
  CPC .............. *H02J 50/12* (2016.02); *H02J 50/90* (2016.02); *A61B 2560/0214* (2013.01); *A61B 2562/166* (2013.01); *H02J 2310/23* (2020.01)

(56) References Cited

U.S. PATENT DOCUMENTS

| | | |
|---|---|---|
| 9,615,181 B2 | 4/2017 | Nagl et al. |
| 9,669,223 B2 | 6/2017 | Auricchio et al. |
| 9,750,930 B2 | 9/2017 | Chen |
| 10,434,329 B2 | 10/2019 | Poon et al. |
| 2014/0277260 A1 | 9/2014 | Khalil et al. |
| 2017/0202467 A1 | 7/2017 | Zitnik et al. |
| 2017/0281944 A1 | 10/2017 | Khalil et al. |
| 2019/0275330 A1* | 9/2019 | Sabesan ............. A61N 1/36171 |
| 2020/0139136 A1 | 5/2020 | Oron et al. |

\* cited by examiner

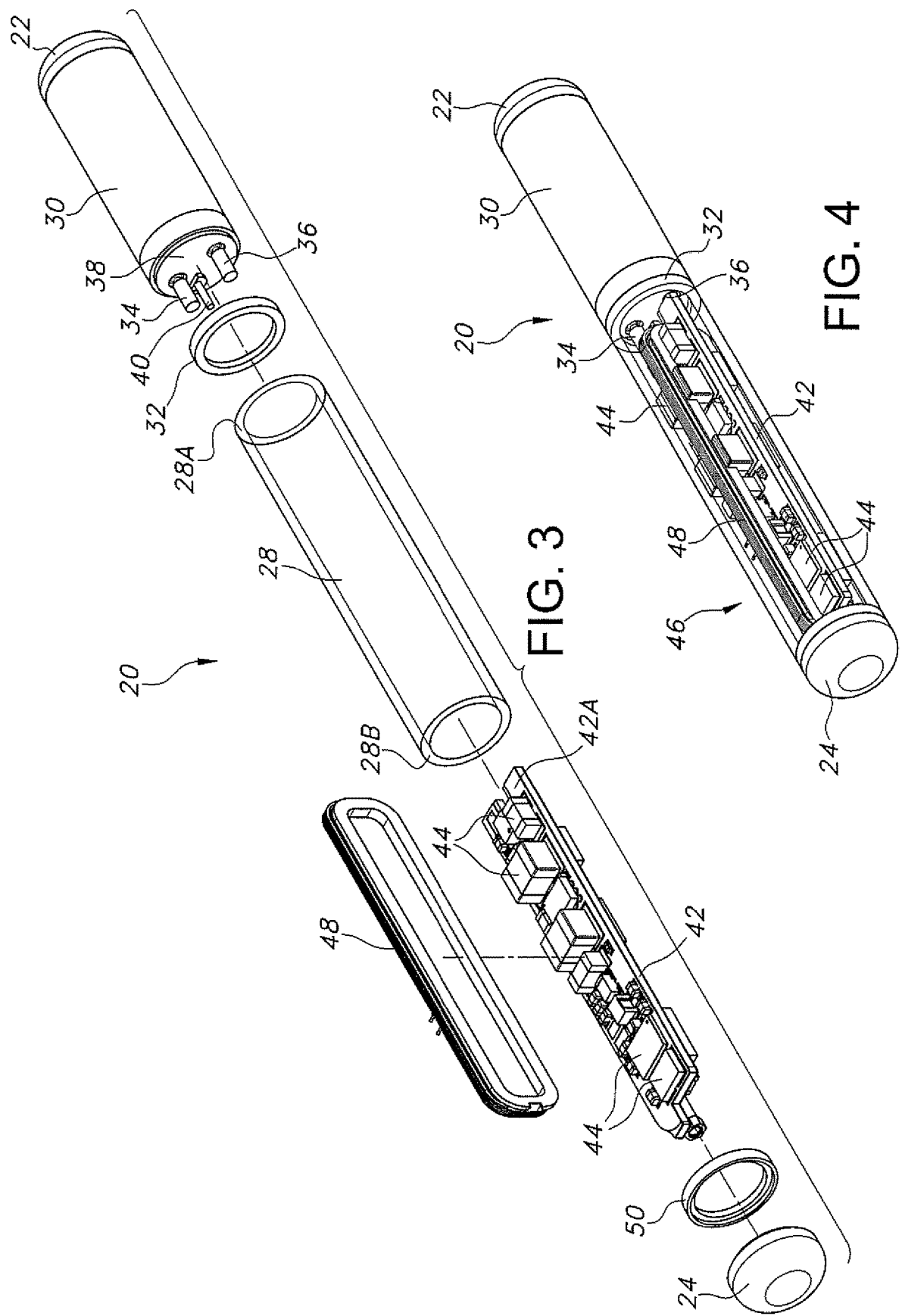

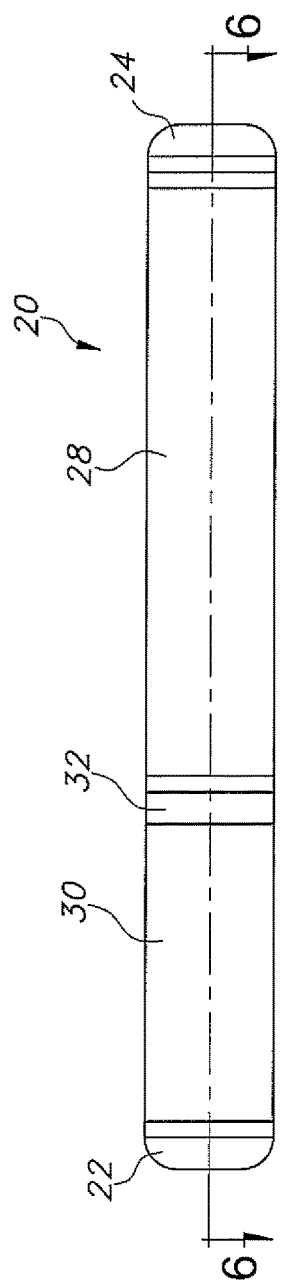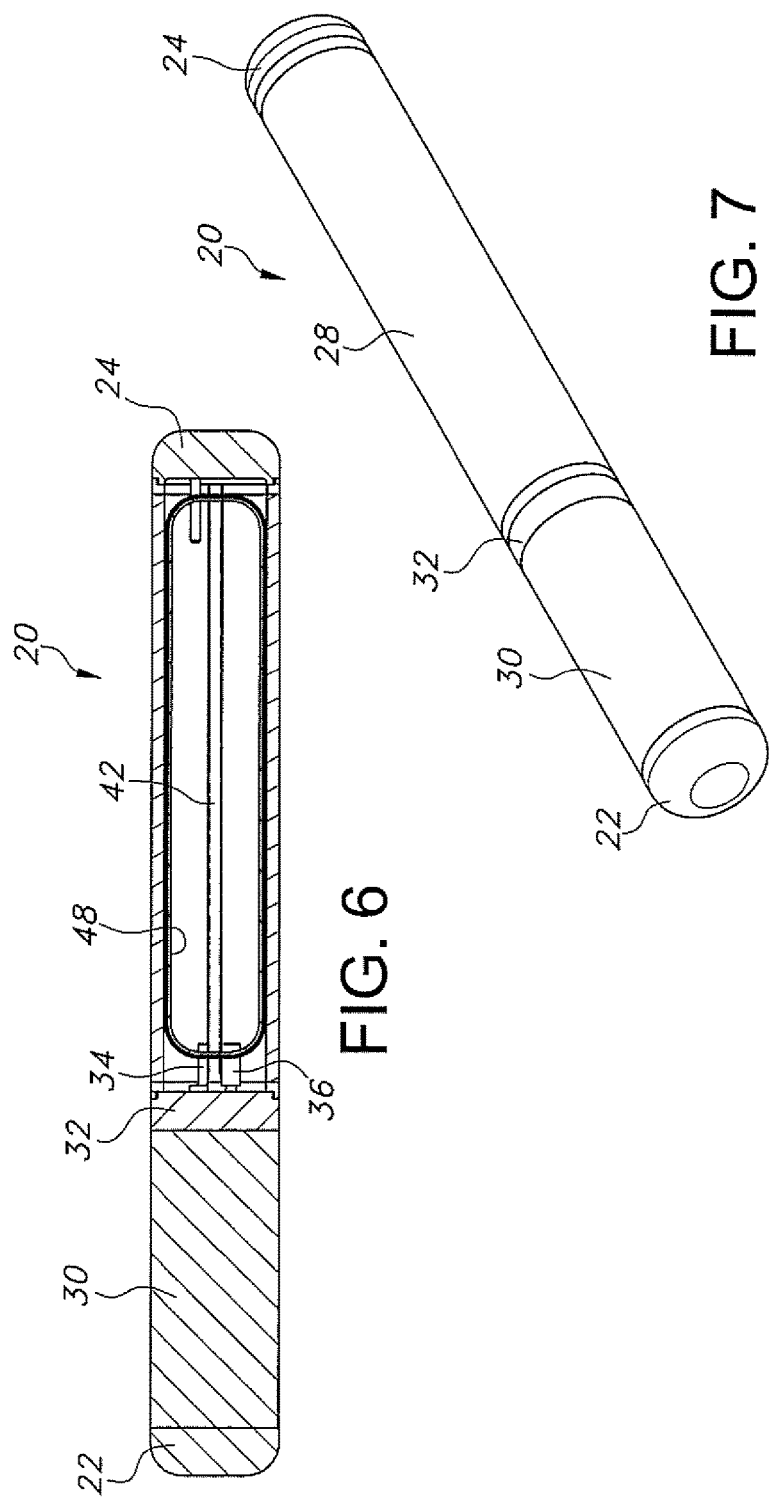

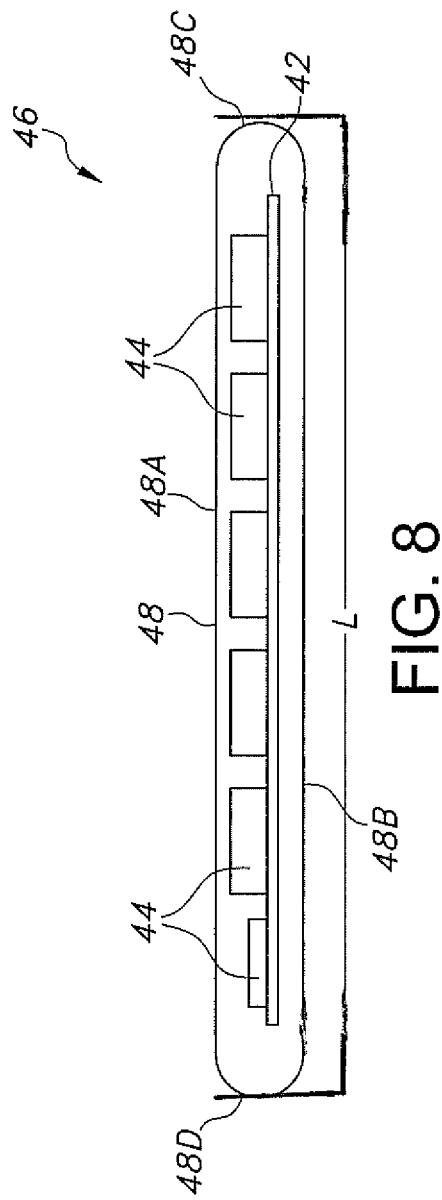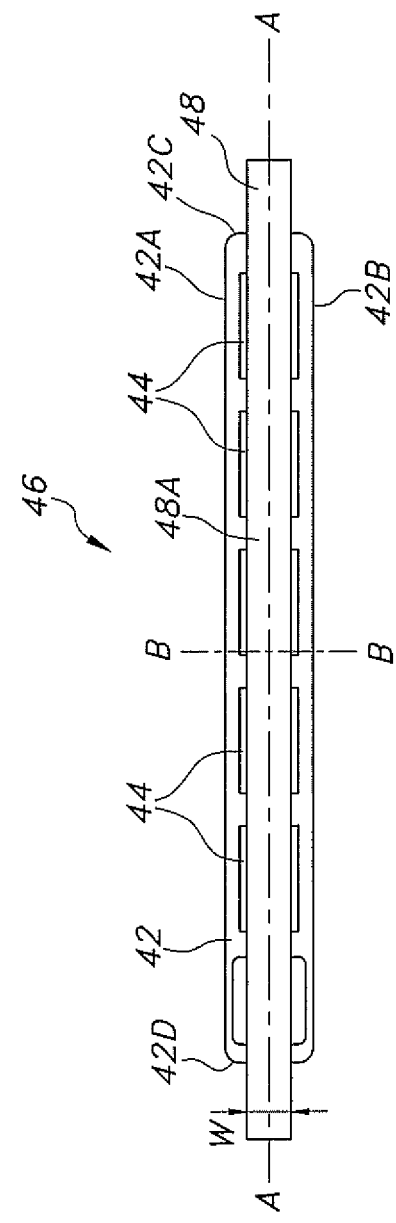

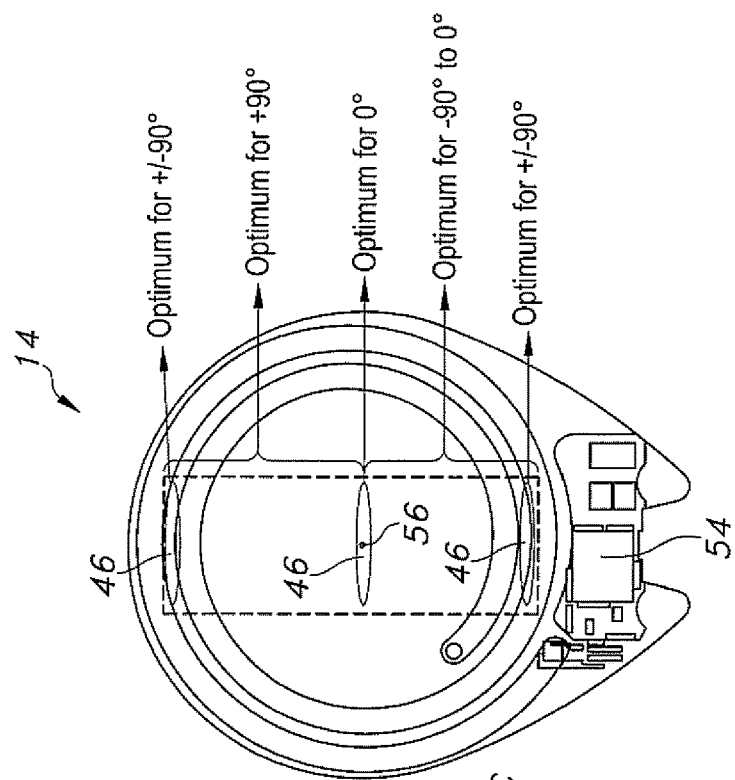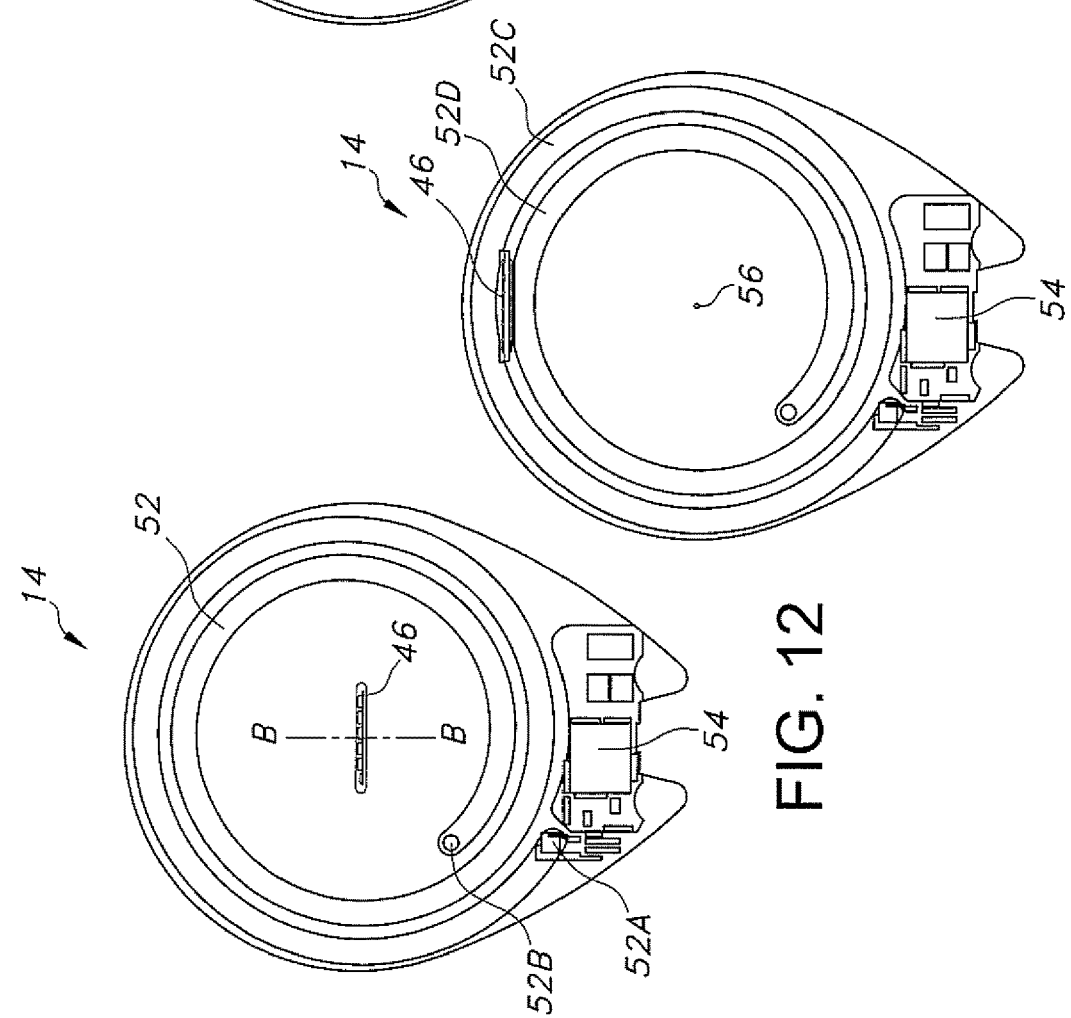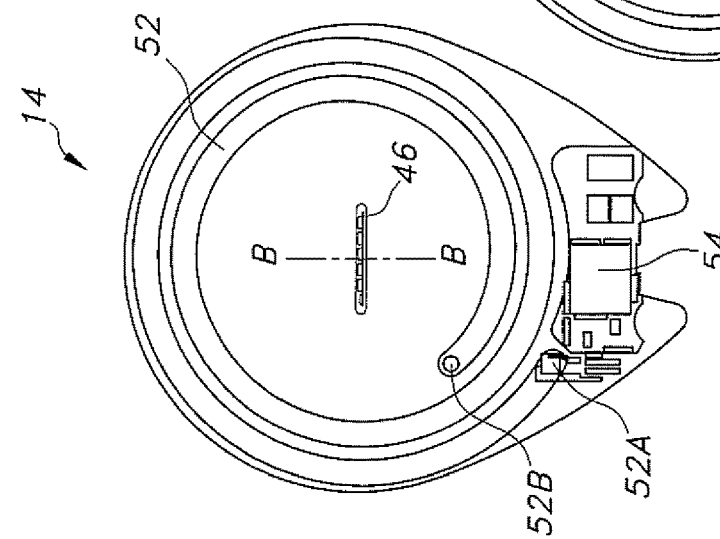
FIG. 14
FIG. 13
FIG. 12

INDUCTIVE CHARGING COIL CONFIGURATION FOR AN IMPLANTABLE MEDICAL DEVICE

CROSS-REFERENCE TO RELATED APPLICATION

This application claims priority to U.S. Provisional Application Ser. No. 63/227,481, filed on Jul. 30, 2021.

BACKGROUND OF THE INVENTION

1. Field of the Invention

The present invention relates to the field of implantable medical devices. More particularly, the present invention relates to an active implantable medical device (AIMD) that is a battery- or capacitor-powered device designed to deliver electrical stimulation to a patient or to sense biological signals from body tissue. The AIMD of the present invention is an elongate medical device having a cylindrically-shaped enclosure that contains a printed circuit board (PCB) supporting a plurality of electronic components. A charging coil housed inside the enclosure is configured to charge a Li-ion battery or capacitor that is connected to the PCB. The charging coil is wrapped around the PCB in a configuration that minimize Eddy currents, which improves the Q of the inductive charging coil.

2. Prior Art

An elongate AIMD typically contains a printed circuit board (PCB) that supports a plurality of electronic components. A charging coil housed inside an elongate enclosure for the medical device is connected to a battery or a capacitor for powering the medical device. In conventional designs for an AIMD, the charging coil is wrapped around a support structure, which can be the PCB or some other structure, so that an axis of the wound coil is aligned along the longitudinal axis of the elongate enclosure. The charging coil of the present invention, however, is wound along the longitudinal axis of the PCB so that its winding axis is perpendicular to the longitudinal axis of the elongate enclosure.

SUMMARY OF THE INVENTION

As medical device technologies continue to evolve, active implantable medical devices have gained increased popularity in the medical field. An AIMD is a battery-or capacitor-powered device that is designed to deliver electrical stimulation to a patient or sense biological signals from the patient. In the case of an implantable pulse generator (IPG), through proper electrical stimulation, the medical device can provide pain relief for a patient. In effect, the electrical signals sent by the IPG "mask" or modify the pain signals before they reach the patient's brain. As a result, instead of pain, the patient may feel only a tingling sensation known as paresthesia in the area that is being stimulated. For example, peripheral nerve stimulation has been used to treat chronic pain emanating from a patient's extremity, such as in the patient's arm or leg.

In order to provide an AIMD as a device that can stay inside the patient's body for many years without needing to be replaced, an inductive charging coil housed inside an elongate device enclosure is connected to a capacitor or battery powering the medical device. The inductive charging coil has at least one to numerous winds of an electrically conductive wire or tape that wrap around the PCB that supports at least one, but preferably a plurality of electronic components for the AIMD. The at least one, but preferably multiple turns of the inductive charging coil about the PCB provide the charging coil with a width aligned along a winding axis that is perpendicular to a longitudinal axis of the elongate enclosure. The winds of the inductive charging coil have an upper wind portion residing above the PCB and a lower wind portion below the PCB. Opposed curved ends of the inductive charging coil winds are continuous with the upper and lower wind portions. This structure provides the inductive charging coil with a length aligned along the longitudinal axis of the PCB. In that manner, the inductive charging coil occupies a space that is otherwise not used in an elongate cylindrical enclosure.

Depending on the orientation of the AIMD when implanted in body tissue, the inductive charging coil will use that portion of the magnetic field generated by an external transmitting coil that is perpendicular to the skin (below the center of the external transmitting coil) or parallel to the skin (below the winds of the external transmitting coil). Consequently, more efficient power transfer from the external transmitting coil to the inductive charging coil of the AIMD means that more power is received by the implant for a depth of up to about 60 mm into the patient's body.

These and other aspects of the present invention will become increasingly more apparent to those skilled in the art by reference to the following detailed description and to the appended drawings.

BRIEF DESCRIPTION OF THE DRAWINGS

FIG. 3 is an exploded view of the exemplary active implantable medical device (AIMD) 20 shown in the medical system 10 of FIG. 2.

FIG. 4 is a fully assembly, but partially broken-away, view of the AIMD 20 shown in FIG. 3.

FIG. 5 is a side elevational view of the AIMD 20 shown in FIGS. 3 and 4.

FIG. 6 is a cross-sectional view taken along lines 6-6 of FIG. 5.

FIG. 7 is a perspective view of the AIMD 20 shown in FIGS. 3 to 6.

FIG. 8 is a side elevational view of a PCB/inductive charging coil assembly 46 comprising an inductive charging coil 48 wrapped around a PCB 42 supporting a plurality of electronic components 44.

FIG. 9 is a plan view of the PCB/inductive charging coil assembly 46 shown in FIG. 8.

Figure 2:
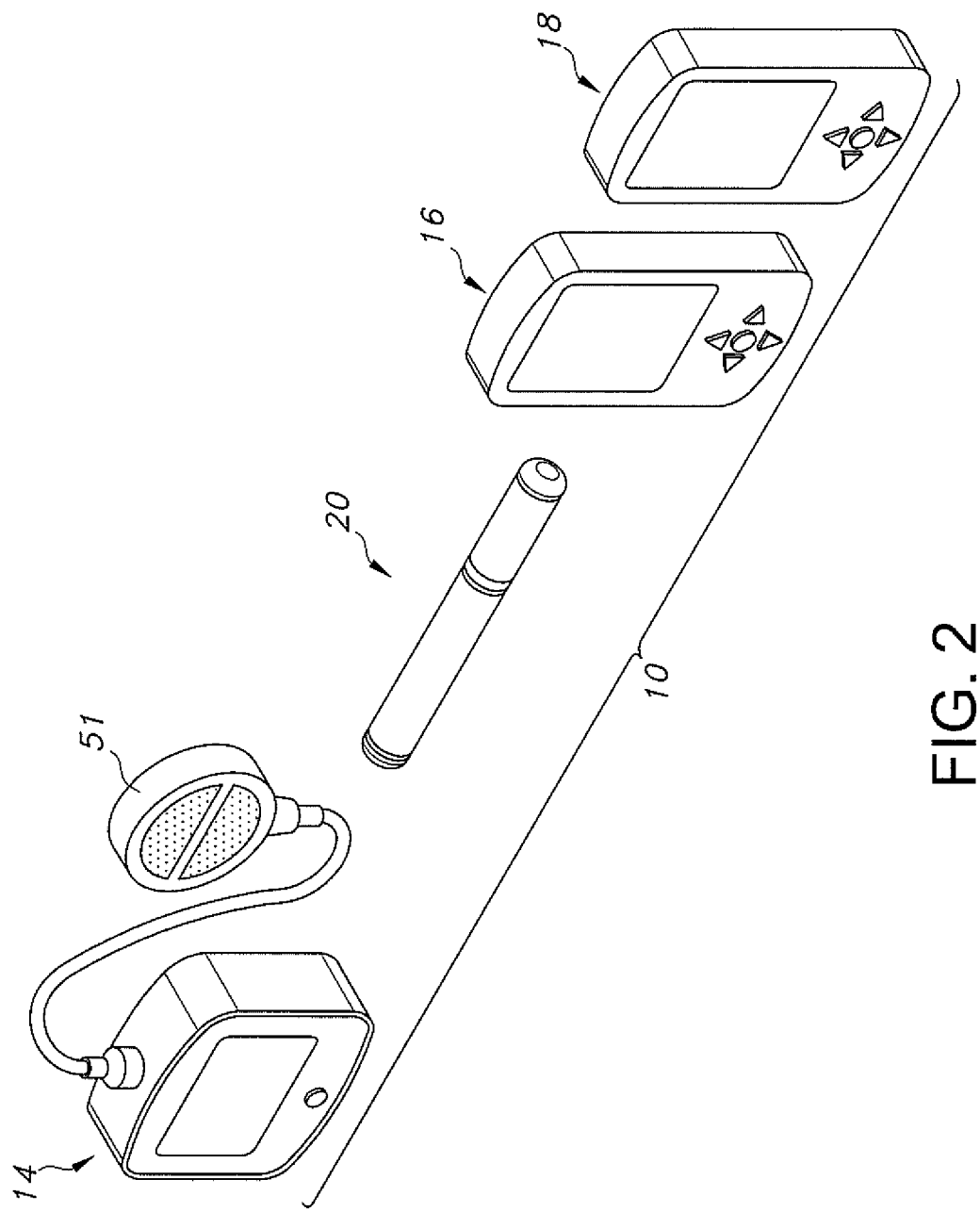
FIG. 2 is a simplified block diagram of an exemplary medical system 10 according to various embodiments of the present invention.

FIGS. 12 to 16 illustrate various exemplary positions for the PCB/inductive charging coil assembly 46 of an implanted AIMD 20 with respect to a transmitting coil 52 contained in an external charging pad 51 connected to the external charger 14 for the medical device system 10 illustrated in FIG. 2.

Figure 17A:
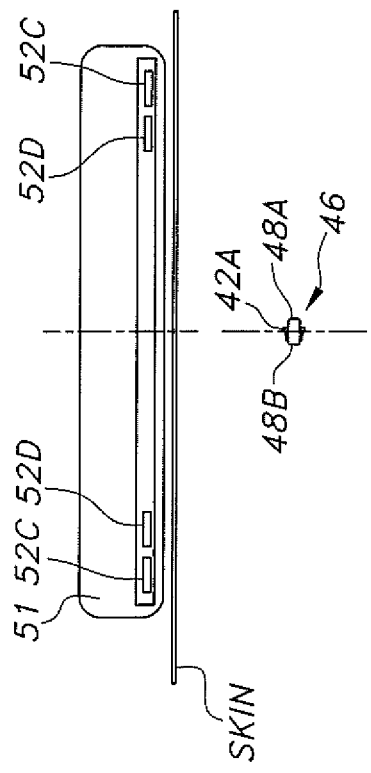

FIG. 17A is a schematic drawing showing the PCB/inductive charging coil assembly 46 with the upper PCB edge 42A facing the skin of the patient, referred to as a 0° position.

Figure 17B:
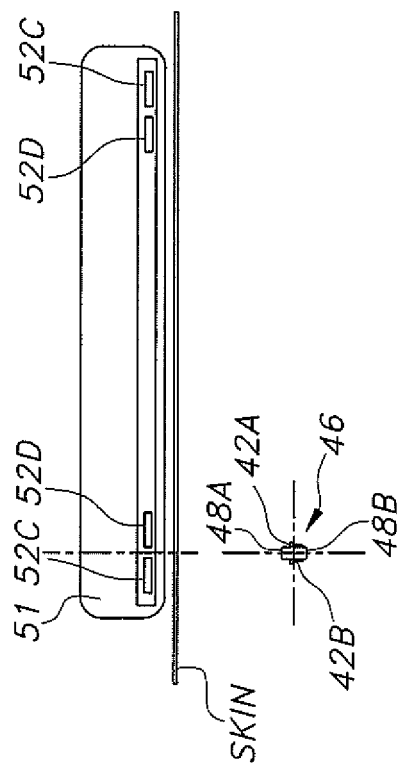

FIG. 17B is a schematic drawing showing the PCB/inductive charging coil assembly 46 with one of the upper and lower wind portions 48A and 48B facing the skin of the patient, referred to as a +90° position.

Figure 18:
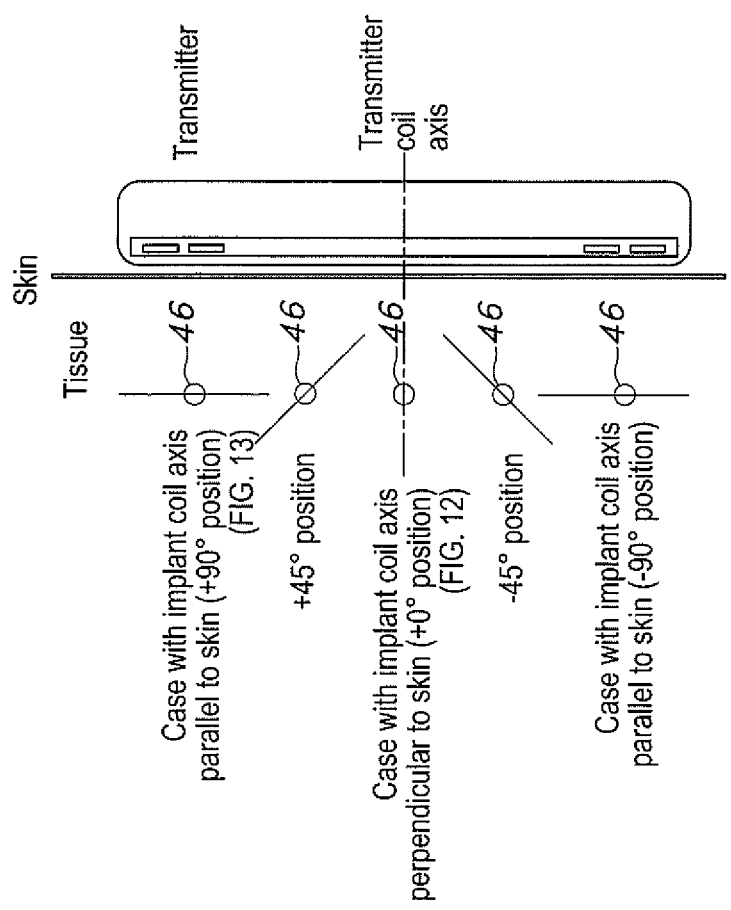

FIG. 18 is a schematic view showing various positions of the PCB/inductive charging coil assembly 46 implanted in body tissue with respect to the transmitting coil 52 contained in an external charging pad 51.

DETAILED DESCRIPTION OF THE PREFERRED EMBODIMENTS

Figure 1:
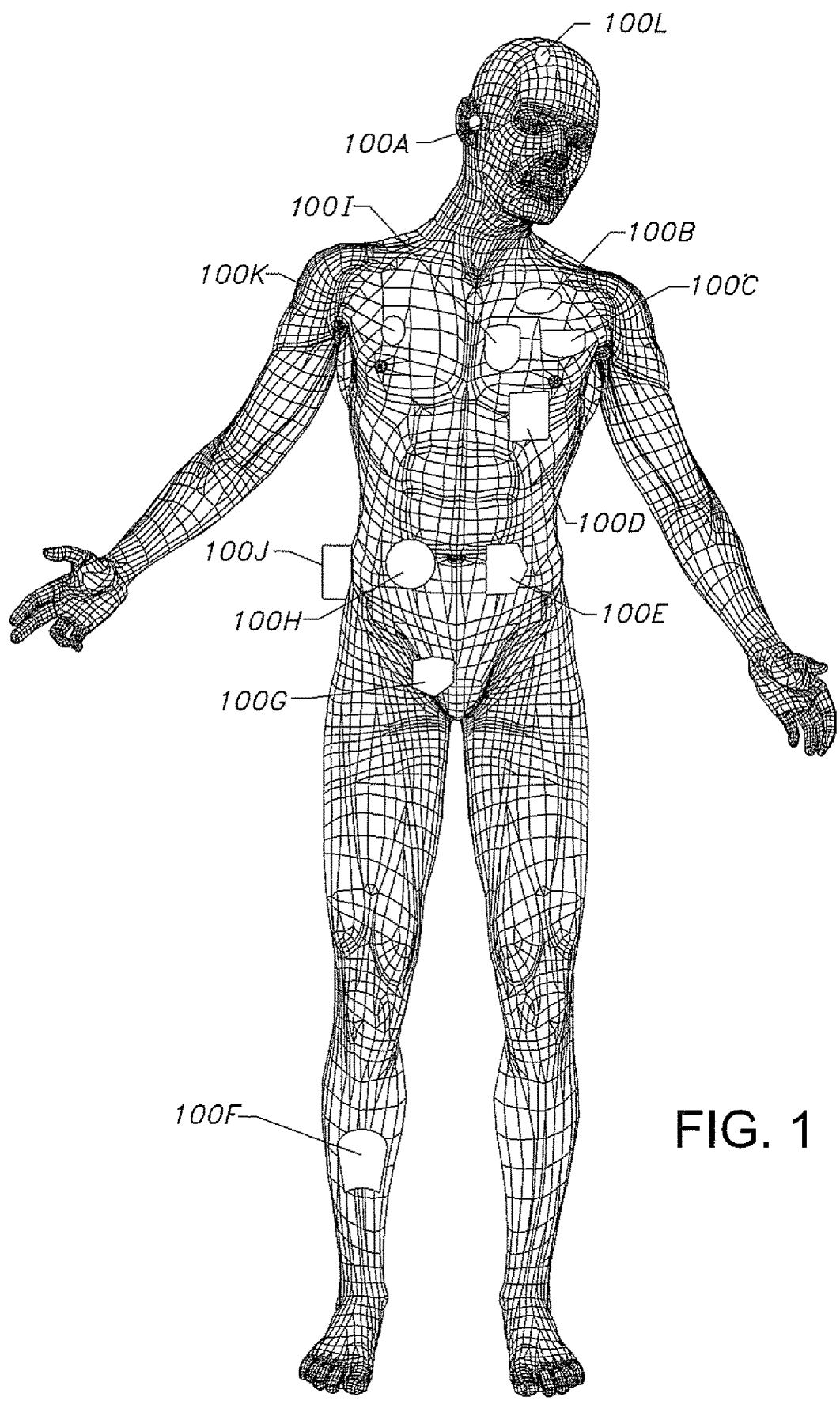
FIG. 1 is a wire formed diagram of a generic human body showing a number of medical devices 100A to 100L that can either be implanted in a patient's body tissue or attached externally to the body.

Turning now to the drawings, FIG. 1 is a wire formed diagram of a generic human body illustrating various types of active implantable and external medical devices 100 that can either be implanted in a patient's body tissue or attached externally to the body.

Numerical designation 100A represents a family of hearing devices which can include the group of cochlear implants, piezoelectric sound bridge transducers and the like. Numerical designation 100B represents a variety of neurostimulators and brain stimulators. Neurostimulators are used to stimulate the Vagus nerve, for example, to treat epilepsy, obesity and depression. Brain stimulators are pacemaker-like devices and include electrodes implanted deep into the brain for sensing the onset of a seizure and also providing electrical stimulation to brain tissue to prevent a seizure from actually occurring. The lead wires associated with a deep brain stimulator are often placed using real time MRI imaging. Numerical designation 100C shows a cardiac pacemaker which is well-known in the art.

Numerical designation 100D includes the family of left ventricular assist devices (LVADs), and artificial heart devices. Numerical designation 100E includes a family of drug pumps which can be used for dispensing insulin, chemotherapy drugs, pain medications and the like. Numerical designation 100F includes a variety of bone growth stimulators for rapid healing of fractures. Numerical designation 1000 includes urinary incontinence devices. Numerical designation 100H includes the family of pain relief spinal cord stimulators and anti-tremor stimulators. Numerical designation 100H also includes an entire family of other types of neurostimulators used to block pain. Numerical designation 100I includes a family of implantable cardioverter defibrillator (ICD) devices and also includes the family of congestive heart failure devices (CHF). This is also known in the art as cardio resynchronization therapy devices, otherwise known as CRT devices.

Numerical designation 100J illustrates an externally worn pack. This pack could be an external insulin pump, an external drug pump, an external neurostimulator or even a ventricular assist device. Numerical designation 100K illustrates one of various types of EKG/ECG external skin electrodes which can be placed at various locations. Numerical designation 100L represents external EEG electrodes that are placed on the head.

To provide context to the various medical devices 100A to 100L illustrated in FIG. 1, FIG. 2 illustrates a simplified block diagram of an exemplary medical system 10 according to the present invention. The medical system 10 includes a medical device 12, which can be one of the exemplary medical devices 100A to 100L depicted in FIG. 1, an external charger 14, a patient programmer 16, and a clinician programmer 18. The exemplary medical device 12 may be an active implantable medical device (AIMD) 20.

The patient programmer 16 and the clinician programmer 18 may be a portable handheld device, such as a smartphone or other custom device, that is used to configure the AIMD 20 so that the AIMD 20 can operate in a desired manner.

The patient programmer 16 is used by the patient in whom the AIMD 20 is implanted. The patient may adjust the parameters of electrical stimulation delivered by the AIMD 20, such as by selecting a stimulation program, changing the amplitude and frequency of the electrical stimulation, and other parameters, and by turning stimulation on and off.

The clinician programmer 18 is used by medical personnel to configure the other system components and to adjust stimulation parameters that the patient is not permitted to control, such as by setting up stimulation programs among which the patient may choose, and by setting upper and lower limits for the patient's adjustments of amplitude, frequency, and other parameters. It is also understood that although FIG. 2 illustrates the patient programmer 16 and the clinician programmer 18 as two separate devices, they may be integrated into a single programmer in some embodiments.

Referring now to FIGS. 3 to 7, the exemplary AIMD 20 illustrated in FIG. 2 is shown in greater detail. The AIMD 20 is a cylindrically-shaped device having a length of about 33 mm and a diameter of about 4 mm. The AIMD 20 has at least two spaced-apart dome-shaped electrical contacts or electrodes 22 and 24. The electrodes 22 and 24 serve to provide current to tissue and/or to sense electrical signals. According to the present invention, however, the shape of the AIMD 20 is not limited to the cylindrical shape that is shown and the shape of the electrodes 22, 24 is not limited to the dome-shape that is shown. The AIMD 20 could have a shape other than cylindrical and the electrode 22, 24 could be, for example, ring shaped.

The AIMD 20 comprises a non-conductive, cylindrically-shaped enclosure 28, for example, of ceramic, and an electrical energy power source 30. However, the material of the cylindrical enclosure 28 is not limited to ceramic; other non-conductive materials, such as glass (e.g., HPFS) or plastic (e.g., PEEK) may be used as long as they are biocompatible and offer the appropriate mechanical robustness. The electrical power source 30 can be a capacitor or a rechargeable battery, for example a hermetically sealed rechargeable Li-ion battery, preferably of a graphite/nickel manganese cobalt chemistry.

As a cylindrically-shaped member, the ceramic enclosure 28 has a lumen that extends to opposed first and second or proximal and distal open ends 28A and 28B. The cylindrically-shaped electrical power source 30 is secured to the first or proximal end 28A of the enclosure 28 by a first intermediate weld ring 32, preferably of titanium. The proximal end 28A of the ceramic enclosure 28 is welded to one end of the first weld ring 32 while the electrical power source 30 is welded to the other end of the ring, opposite the enclosure 28. To hermetically weld the ceramic enclosure 28 to the weld ring 32, a metallization is provided on the ceramic surface. For a more detailed description of welding ceramic to titanium, reference is made to U.S. Pub. No. 2021/0111382 to Rubino et al., which is assigned to the assignee of the present invention and incorporated herein by reference.

The electrical power source 30 supports the previously described dome-shaped electrode 22, which is spaced from the enclosure 28 and the first weld ring 32. The electrical power source 30 is preferably constructed in a case-neutral design with opposite polarity negative and positive terminal pins 34 and 36 extending outwardly from a header 38. A case-neutral design means that neither terminal pin 34 nor 36 is electrically connected to the electrical power source casing. A third terminal pin 40 also extends outwardly from the electrical power source 30 and its function will be discussed in detail hereinafter.

The opposite polarity electrical power source terminal pins 34 and 36 are electrically connected to a rigid or flexible printed circuit board (PCB) 42 housed in the lumen of the ceramic enclosure 28. The PCB 42 supports at least one, and preferably a plurality of electronic components 44 as an assembly that controls the various functions performed by the AIMD 20. These include, but are not limited to, receiving sensed electrical signals pertaining to functions of the body tissue in which the AIMD 20 is implanted and for delivering electrical current pulses to the body tissue through the electrodes 22 and 24.

As shown in FIGS. 8 and 9, a PCB/inductive charging coil assembly 46 comprises an inductive charging coil 48 wrapped around the PCB 42 supporting the electronic components 44. The PCB 42 has spaced apart long edges 42A and 42B that extend to and meet with opposed ends 42C and 42D. A longitudinal axis A-A intersects the ends 42C, 42D of the PCB, centered midway between the edges 42A, 42B. A perpendicular axis B-B intersecting the edges 42A, 42B of the PCB 42 is centered midway between the ends 42C, 42D. The benefit of having the charging coil 48 aligned parallel to the longitudinal axis A-A of the PCB 42 is to minimize Eddy currents, which improves the Q of the inductive charging coil 48. Improving magnetic coupling and the Q result in more efficient wireless power transfer.

FIGS. 8 and 9 show that the inductive charging coil 48 has at least one to numerous winds of an electrically conductive wire or tape that wrap around the longitudinal axis of the PCB 42 in a surrounding manner. The at least one, but preferably multiple turns of the inductive charging coil 48 about the PCB 42 provide the charging coil 48 with a width "W" that is aligned along the perpendicular axis B-B, but this width is shorter than the opposed ends 42C and 42D of the PCB. The winds of the inductive charging coil 48 have an upper wind portion 48A residing above the PCB 42 and a lower wind portion 48B residing below the PCB. Opposed curved ends 48C and 48D of the inductive charging coil winds are continuous with the upper and lower wind portions 48A and 48B. This structure provides the inductive charging coil 48 with a length "L" that is aligned along the longitudinal axis A-A and that is longer than the edges 42A, 42B of the PCB. Preferably, the inductive charging coil 48 is centered between the edges 42A, 42B and extends about the same distance outwardly past the ends 42C, 42D of the PCB 42. Alternatively, the curved ends 48C and 48D of the inductive charging coil 48 can contact the respect ends 42C and 42D of the PCB 42.

Referring back to FIGS. 3 and 4, with the PCB/inductive charging coil assembly 46 residing in the lumen of the ceramic enclosure 28, the electrical power source terminal pins 34 and 36 are electrically connected to electrical and electronic components including circuit traces at a proximal end 42A of the circuit board 42. The previously described third terminal pin 40 extending outwardly from the electrical power source 30 is connected to the inductive charging coil 48.

The distal end 28B of the ceramic enclosure 28 is secured to the distal dome-shaped electrode 24 by a second weld ring 50, preferably of titanium. The distal end 28B of the ceramic enclosure 28 is welded to one end of the second weld ring 50 while the distal electrode 24 is welded to the other end of the ring, opposite the enclosure 28. As previously discussed, a metallization is provided on the ceramic surface to hermetically weld the ceramic enclosure 28 to the weld ring 50.

Figure 10:
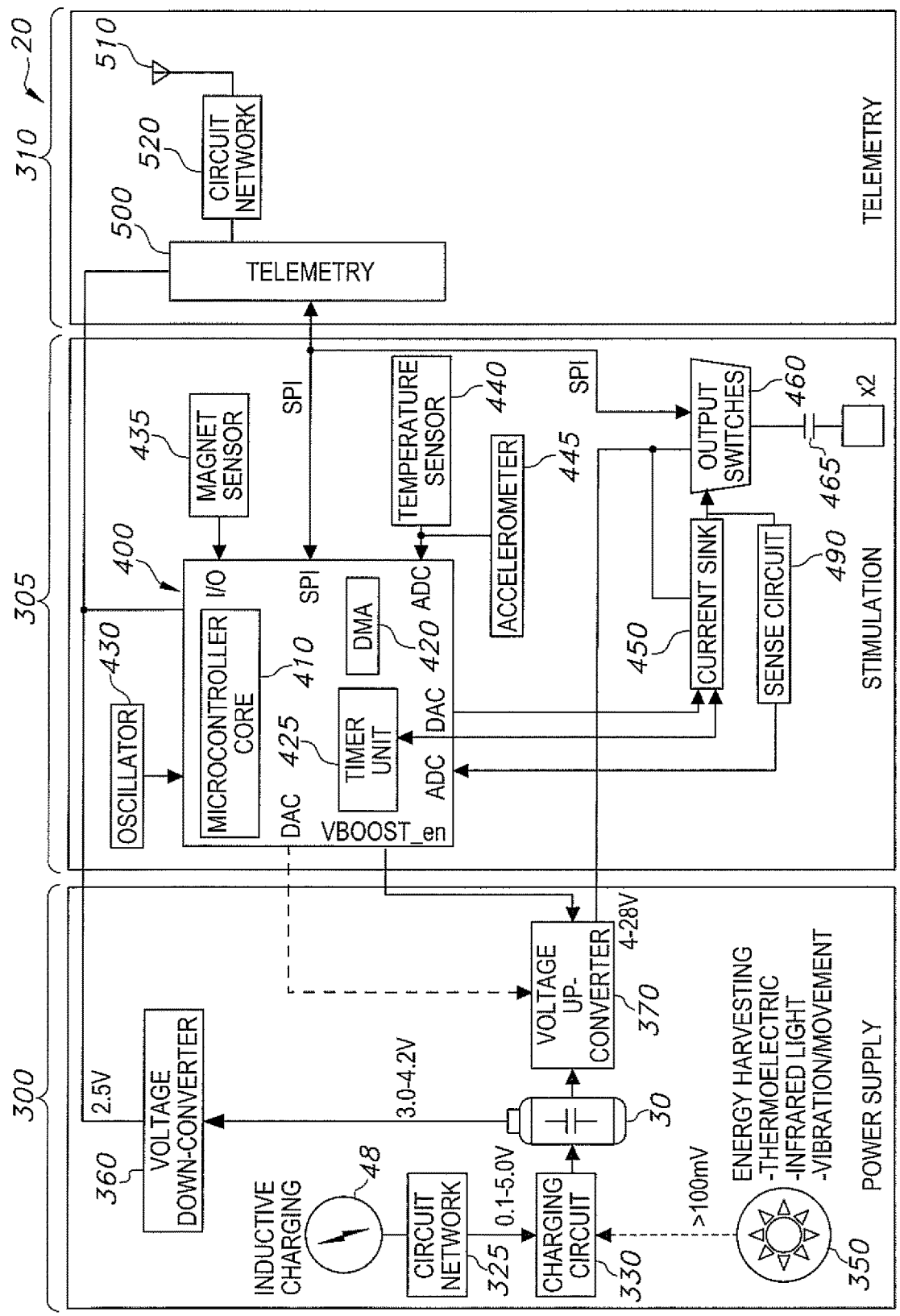
FIG. 10 illustrates a simplified block diagram of the exemplary AIMD 20 shown in FIGS. 2 to 7.

Referring now to FIG. 10, a simplified block diagram of the electrical power source 30 powering the PCB/inductive charging coil assembly 46 of the AIMD 20 is illustrated. The AIMD 20 includes a power supply circuitry section 300, a stimulation circuitry section 305, and a telemetry circuitry section 310. The power supply circuitry section 300 includes the inductive charging coil 48, which is configured to receive power/energy inductively from an external charger, for example from the external charger 14 discussed above with reference to FIG. 2. In some embodiments, the inductive energy (i.e., the charging signal voltage) received by the inductive charging coil 48 from the external charger 14 ranges from about 0.1 volts to about 5 volts in amplitude, and it has a frequency range that is within one of the Industrial, Scientific, and Medical (ISM) radio bands. For example, in some embodiments, the inductive energy is in a 13.56 MHz band, that is, it ranges from 13.553 MHz to 13.567 MHz with a center frequency at 13.56 MHz. In other embodiments, the inductive energy may be in alternative ISM radio bands.

The power supply circuitry section 300 further includes a circuit network 325. The circuit network 325 includes electronic components that provide a resonant frequency at or near the center frequency of the ISM radio band associated with the inductive energy received by the inductive charging coil 48. Thus, in the embodiments where the inductive energy is in the 13.56 MHz ISM radio band, the microelectronic components of the circuit network 325 provide a resonant frequency at or near 13.56 MHz. This resonant frequency allows the inductive energy to pass through, but effectively rejects signals from outside the selected ISM radio band. For example, telemetry signals that have much higher (or lower) frequencies than the selected ISM radio band will be blocked by the circuit network 325. In this manner, the circuit network 325 may function similar to a filter.

The power supply circuitry section 300 also includes a charging circuit 330 that is electrically coupled to the inductive charging coil 48. The charging circuit 330 includes various electronic components that convert the inductive energy received by the inductive charging coil 48 from the external charger 14 into a direct current (DC) voltage. In some embodiments, the charging circuit 330 may include a voltage booster that can convert a lower input voltage to a higher output voltage, so as to adequately charge the electrical power source 30 coupled thereto. In some embodiments, the AC current taken from the inductive charging coil 48 may be controlled in order to maximize power to the electrical power source 30, thus maximizing efficiency, or limiting the current to the electrical power source when necessary. In some embodiments, the electrical power source 30 is configured to output a DC output voltage ranging from about 3.5 volts to about 4 volts. Thus, the charging circuit 330 can boost an input voltage (e.g., received by the inductive charging coil 48) to meet or exceed the requisite DC output voltage of the electrical power source 30.

If desired, the power supply circuitry section 300 may further include an energy harvesting component 350 that is configured to supply power to the electrical power source 30. As is illustrated, the output of the energy harvesting component 350 is electrically coupled to the charging circuit 330, which boosts the energy harvested by the energy harvesting component to a level that can be used to charge the electrical power source 30. In some embodiments, the energy harvesting component 350 includes a thermoelectric generator (TEG) that converts the body heat of the patient (inside whom the AIMD 20 is implanted) to electrical energy. The converted electrical energy may then be used to charge the electrical power source 30 (after being boosted up by the charging circuit 330). In some other embodiments, the energy harvesting component 350 may also include circuitry to convert infrared light and/or vibration and movement of the patient into electrical energy. In various embodiments, the electrical energy harvested by the energy harvesting component 350 may exceed about 100 millivolts (mV).

The power supply circuitry section 300 also includes a voltage down-converter 360 coupled to the electrical power source 30. The voltage down-converter 360 converts the nominal DC output voltage of the electrical power source 30 to a lower level suitable for powering some of the electronic circuitry of the AIMD 20, such as a microcontroller, amplifiers, and telemetry circuitry (discussed below in more detail). For example, in embodiments where the DC voltage output of the electrical power source 30 is about 4 volts, the down-converter 360 reduces it to about 2.5 volts. In the illustrated embodiment, 2.5 volts is a sufficient voltage to power electronic components such as the microcontroller, amplifiers, or the telemetry circuitry, and thus there is no need to waste power that would be consumed when supplying the higher voltage output (e.g., 4 V) produced by the electrical power source 30. In other words, the voltage down-converter 360 saves energy by down-converting the DC voltage output of the electrical power source 30. In some embodiments, the voltage down-converter 360 includes a buck regulator or a low-dropout (LDO) linear regulator.

The power supply circuitry section 300 further includes a voltage up-converter 370 coupled to the electrical power source 30. The voltage up-converter 370, when turned on, converts the nominal DC output voltage of the electrical power source 30 to a higher level to enable high output voltage compliance for electrical stimulation. In more detail, electrical stimulation pulses for stimulation therapy may require higher voltages (e.g., as high as 28 volts) than the nominal DC voltage output of the electrical power source 30. In these cases, the voltage up-converter 370 may be activated to boost the DC output voltage of the electrical power source 30, for example from 4 volts to 28 volts, or at a fractional value in between. In some embodiments, the microcontroller can adjust the DC output voltage as needed in order to maximize efficiency according to the programmed pulse current and tissue impedance. In the illustrated embodiment, the voltage up-converter 370 supplies power to stimulation circuitry (e.g., a stimulation driver) that will be discussed below in more detail hereinafter. To accomplish the voltage boost, the voltage up-converter 370 includes a step-up in the exemplary AIMD 20, but it is understood that it may include other types of voltage up-converters in alternative embodiments (such as a charge pump). In some embodiments, the voltage-up converter 370 requires a circuit that disconnects its output in order to avoid consumption from its output capacitor between stimulation pulses.

It is understood that the specific voltage values here are provided merely as an example and are not intended to be limiting. For example, the voltage down-converter 360 may down-convert a 4-volt DC output of the electrical power source 30 to a 2.3-volt DC voltage that will then be supplied to certain electronic circuitry of the AIMD 20. As another example, the voltage up-converter 370 may up-convert a 4-volt DC output from the electrical power source 30 to a number that is a fraction (greater than 1) of the 4-volt DC voltage.

The stimulation circuitry section 305 includes a microprocessor or microcontroller 400 (referred to as a microcontroller hereinafter) that is powered by the output of the voltage down-converter 360. The microcontroller 400 controls various operations of the AIMD 20. For example, the microcontroller 400 is configured to generate electrical stimulation pulses in response to programming instructions received from a programmer, such as from the patient programmer 16 and the clinician programmer 18 discussed above with reference to FIG. 2. In various embodiments, the microcontroller 400 may include a microcontroller chip (e.g., an applications processor) with internal instruction and data caches, multimedia capabilities, external memory interfacing, and interfacing flexibility.

The microcontroller 400 may also include memory such as FLASH memory, a read-only memory ("ROM"), a random-access memory ("RAM"), an electrically erasable programmable read-only memory ("EEPROM"), or electronic memory device. In some embodiments, the microcontroller 400 includes a double data rate (DDR2) synchronous dynamic random-access memory (SDRAM) for storing data relating to and captured during operation of the AIMD 20. Of course, other types of data storage devices may be used in place of the data storage devices discussed herein. It is understood that the different types of memory discussed above may be integrated into the microcontroller chip discussed above or may be separately implemented from the microcontroller chip. Software code, firmware code, or other types of program modules and applications may be stored on the memory and may be executed to perform certain tasks, such as generating the stimulation pulses.

According to some embodiments of the present invention, the microcontroller 400 is configured to perform one or more of the following tasks:
- generating stimulation waveforms with internal 12-bit DAC, contact combinations, and manages compliance voltage,
- managing bidirectional telemetry & external communications,
- managing sensing for impedance, electrical power source voltage, and physiological signals,
- storing data for diagnostics and device use tracking Store Code, bootloader, and other suitable data in onboard FLASH and RAM,
- entering various power-conservation consumptions modes to reduce power consumption,
- managing emergency ON/OFF states or exiting sleep mode by using a magnetic switch and/or by receiving inductive power, and
- reconfiguring the system with a new firmware download.

As is shown in FIG. 10, the microcontroller 400 includes a microcontroller core 410. Most of the functions of the microcontroller 400 discussed above may be performed by, or at least in part by, the microcontroller core 410. As such, the microcontroller core 410 is a power-hungry device and consumes significantly more power than the rest of the electronic components of the microcontroller 400. In order to save power, the microcontroller 400 also includes a direct memory access (DMA) unit 420. In some embodiments, the DMA unit 420 is a task handler that can operate independently from the microcontroller core 410. For example, the DMA unit 420 may be capable of sending instructions to peripherals (discussed in more detail below) within the microcontroller 400, without having to go through the microcontroller core 410. One benefit of using the DMA unit 420 is that it consumes substantially less power than the microcontroller core 410. For example, in some embodiments, the DMA unit 420 consumes less than 10% of the power of the microcontroller core 410. Therefore, according to various aspects of the present invention, the DMA unit 420 may be utilized to execute certain simple tasks while the microcontroller core 410 is turned off in order to reduce power consumption.

The microcontroller 400 further includes a plurality of peripherals, channels, or buses. For example, the microcontroller 400 may include one or two digital-to-analog converters (DAC) to generate the waveforms for the electrical stimulation pulses and for adjusting the voltage up-converter 370. The microcontroller 400 may also include analog-to-digital converters (ADC) to convert analog feedback signals to digital numbers. The microcontroller 400 may also include a VBOOST_EN line that is electrically coupled to the voltage up-converter 370. When the VBOOST_EN line is enabled, the voltage up-converter 370 is activated, setting a voltage that is above the electrical power source voltage. In some embodiments, the VBOOST_EN line is only enabled to turn on the voltage up-converter 370 during the stimulation pulse. Between consecutive stimulation pulses, the VBOOST_EN line is disabled to turn off the voltage up-converter 370. In this manner, power consumption is reduced since the voltage up-converter is not running all the time. The microcontroller 400 further includes an Input/Output (I/O) bus, a Serial-Peripheral-Interface (SPI) communication bus, and an Inter-Integrated-Circuit (I$^2$C) communication bus, which allow the microcontroller 400 to communicate with peripherals or external devices.

Another peripheral-like device of the microcontroller 400 is a timer unit 425. The timer unit 425 includes hardware and firmware/software that control the timing for turning the microcontroller core 410 on and off and/or enabling/disabling the peripherals or other electronic components of the AIMD 20. Although not illustrated herein for reasons of simplicity, the microcontroller 400 may also include one or more internal clocks. These internal clocks serve as timing sources for the timer unit 425.

In addition, a crystal oscillator 430 is external to the microcontroller 400 and is coupled to the microcontroller 400. In some embodiments, the crystal oscillator 430 generates a 32.678 kHz clock that may be used when the microcontroller 400 enters a power-conservation operating mode (also referred to as a low-power mode or a sleep mode) to reduce power consumption. The crystal oscillator 430 may also serve as a timing source for the timer unit 425.

In addition to the microcontroller 400, the stimulation circuitry 305 further includes a plurality of sensors that are electrically or communicatively coupled to the microcontroller 400. In the illustrated embodiment shown in FIG. 10, a magnetic sensor 435 is coupled to the microcontroller 400 through the I/O bus, and an accelerometer 445 are each coupled to the microcontroller 400 through the I$^2$C communication bus. A temperature sensor 440 may be connected to an analog-to-digital port of the microcontroller or it may be part of the microcontroller integrated circuit.

In some embodiments, the magnetic sensor 435 may be used to turn the AIMD 20 on or off, the temperature sensor 440 may be used to facilitate the energy harvested by the energy harvesting component 350, and the accelerometer 445 may be used to detect a posture of the patient, which may then be used to perform posture-dependent calibrations. It is understood that these sensors 435, 440 and 445 are merely examples, and that additional sensors such as pressure sensors, humidity sensors, vibration sensors, proximity sensors, light sensors, strain/stress sensors, transducers, gyroscopes, or compasses may be implemented in the AIMD 20 in various embodiments.

The stimulation circuitry section 305 further includes at least one current sink 450 coupled to the DAC output of the microcontroller 400. The current sink 450 converts the input signal to a proportional current. The current for a peripheral nerve stimulator (PNS) could be as high as 7 mA, while for spinal cord stimulation (SCS) it could be up to 25 mA.

The stimulation circuitry section 305 also includes stimulation output switches 460 that are coupled to the current sink 450. The output switches allow for configured stimulation contact combinations. In more detail, the output switches 460 are coupled to a plurality of stimulation channels through DC-blocking capacitors 465, respectively. The switches are coupled in parallel to one another. By turning these switches on and off, electrical stimulation pulses can be delivered to the desired stimulation channel(s).

The output switches are powered by the voltage output produced by the voltage up-converter 370. Thus, the output of the voltage up-converter 370 serves as the power supply for the stimulation driver 450 and the stimulation multiplexers 460 when needed.

The stimulation circuitry section 305 may also include a sense circuit 490 coupled between the output of the sink circuit 450 and the microcontroller 400. In some embodiments, the sense circuit 490 can also measure impedance values or be used as an input to control the voltage up-converter 370.

The telemetry circuitry section 310 includes a telemetry block 500. The telemetry block 500 is powered by the voltage down-converter 360. The telemetry block 500 is also electrically and communicatively coupled to the microcontroller 400. The telemetry block 500 includes one or more transmitters, receivers, and/or transceiver. For example, the telemetry block 500 may include one or more of the following: a Medical Implant Communication Services (MICS) transceiver, an Industrial, Scientific and Medical (ISM) transceiver, a Wi-Fi transceiver, a Bluetooth transceiver, DLNA, or any of the 3G, 4G or 5G cellular networking transceivers. Through the telemetry block 500, the AIMD 20 may conduct bi-directional telecommunications with external devices, for example turning on/off the AIMD 20, receiving commands or programming instructions from the patient programmer 16, the clinician programmer 18 or the external charger 14 any of which may be configured to send programming instructions to the AIMD 20, or to transfer diagnostic data or unique patient information to the mentioned devices or ultimately to a remote server.

The telemetry circuitry section 310 further includes a bidirectional telemetry antenna 510 for transmitting and receiving telemetry signals. The previously described inductive charging coil 48 and the telemetry antenna 510 may be the same component or they may be separate components. In other words, a loop coil or wire may be used to charge the AIMD 20 and the same or a separate coil or wire may be used to conduct telecommunications with the AIMD 20.

According to the various aspects of the exemplary AIMD 20, the telemetry circuitry section 310 includes a plurality of circuits or circuit networks 520 to discriminate different types of input signals received from the telemetry antenna 510.

It is understood that although the circuit network 325 of the power supply circuitry section 300 is not a part of the telemetry circuitry section 310, it also helps provide discrimination of the input signals. As discussed above, the telemetry antenna 510 and the inductive charging coil 48 may be the same conductive component, for example, the previously described inductive charging coil 48 wrapped around the PCB 42 and its supported electronic components 44. In other words, the inductive charging coil 48 may be used to receive both charging signals (e.g., inductive energy in the 13.56 MHz ISM band) and telemetry signals (e/g/, Bluetooth LE or BLE). Thus, the circuit network 325 includes electronic components that allow charging signals in the 13.56 MHz ISM band to pass through but will reject signals outside the 13.56 MHz ISM band while charging the electrical power source 30, including telemetry signals in the 2.45 GHz ISM band (BLE). However, the electronic components of the circuit network 520 will allow telemetry signals to pass when the AIMS 20 is communication with an external device, such as the patient and clinician programmers 16 and 18.

The circuit networks 325 and 520 may also each include passive components such as inductors and capacitors for impedance matching. Impedance matching may maximize power transfer or may reduce signal reflection (for example, reflection from a load). In the illustrated embodiment, the circuit networks 325 of the power supply circuitry section 300 may include passive circuit elements collectively arranged to match the impedances of the inductive charge coil 46 in the 13.56 MHz frequency band. In the illustrated embodiment, the circuit network 520 may include passive circuit elements collectively arranged to match the impedances of the telemetry block 500 and the telemetry antenna 510 in the 2.4 GHz ISM band.

Figure 11:
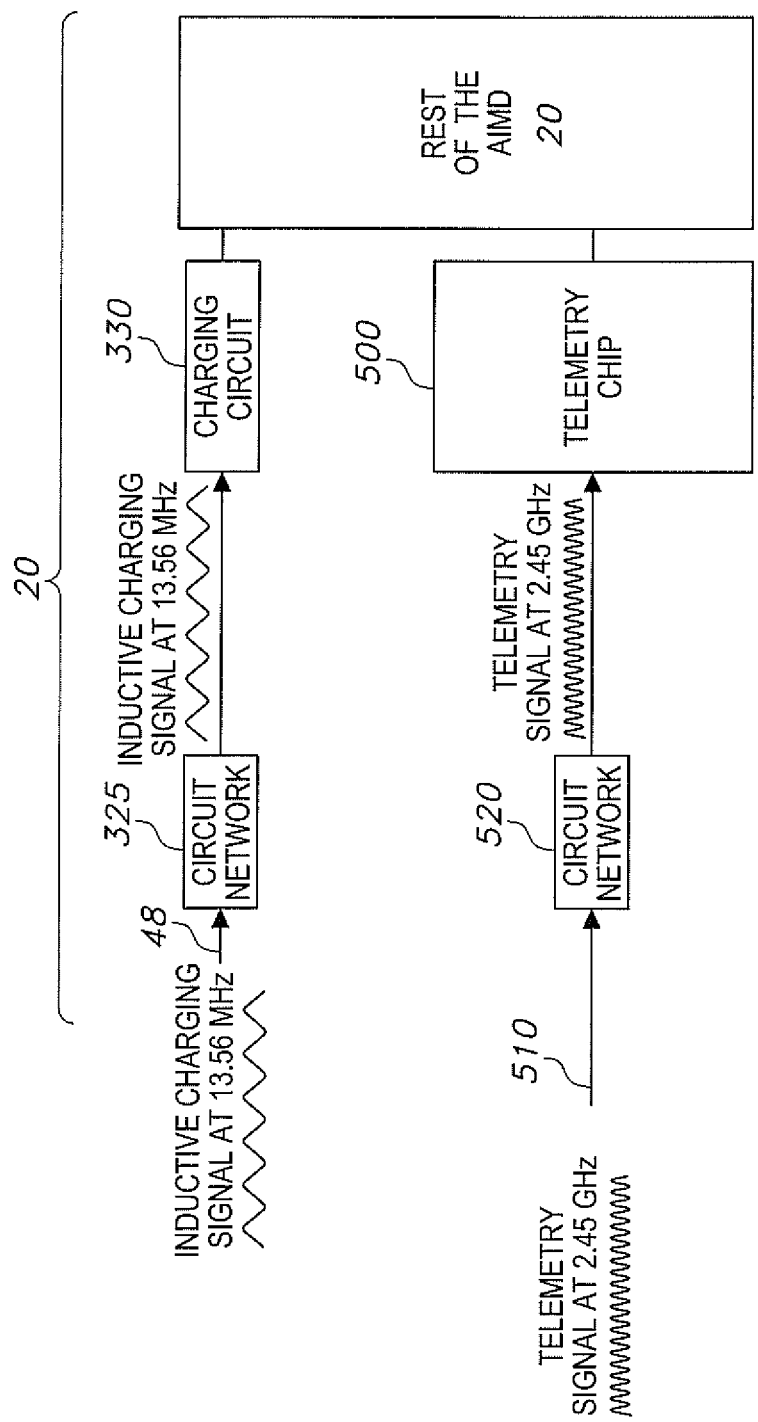
FIG. 11 illustrates a simplified block diagram of the electronic components of the AIMD 20 used to provide signal discrimination according to various embodiments of the present invention.

FIG. 11 is a simplified block diagram of the various electronic components and devices of the AIMD 20 that provide signal discrimination for the different types of signals received and transmitted by the AIMD 20. The inductive charging coil 48 connected to the circuit network 325 is coupled to the charging circuit 330 (FIG. 10) and allows inductive charging signals at the 13.56 MHz band to pass through to the charging circuit 330 by way of resonant network elements. In some embodiments, the circuit network 325 includes a resonant network that generates a high Q at the resonant frequency, where the resonant frequency is tuned to be substantially equal to the frequency of the charging signal (e.g., at 13.56 MHz). As such, the reception of signals is maximized at the charging frequency, thereby allowing the charging signal to pass through with minimal attenuation. This channel may also be used for authentication.

Meanwhile, although the resonant network is not specifically configured to filter out other telemetry bands, the reception of the signals outside the resonant frequency is not maximized due to the resonant frequency being at or substantially near the 13.56 MHz. Thus, the resonant network of the circuit network 325 may effectively function as a very narrow band-pass filter to "block" signals that are outside of the 13.56 MHz band. As such, to the extent that 2.4 GHz telemetry signals are received by the network 325, they will be substantially attenuated by the time they reach the charging circuit 330.

Meanwhile, the telemetry antenna 510 is connected to the circuit network 520 which is coupled to a telemetry chip 500 that is an embodiment of the telemetry block 500 (FIG. 10). Using filters such as a high-pass filter, the circuit network 520 allows telemetry signals at the 2.4 GHz ISM band to pass through to the telemetry chip 500 but blocks out telemetry signals at other frequency bands, for example, inductive charging signals at the 13.56 MHz band. Additionally, the circuit network 520 may include additional passive circuit elements such as inductors and/or capacitors for impedance matching, so as to maximize power transfer or to reduce signal reflection, etc. The filtering out of the undesired signals will minimize the interference that these undesired signals may cause to the desired signals.

Again, it is understood that the frequency bands used herein are merely examples. In other embodiments, the same approach shown in FIG. 11 may be used to provide discrimination of other types of inductive charging signals and telemetry signals that may be collectively received by one of the antennas or coils 48 and 510. It is also understood that in a real-world implementation, it may not be possible to completely block or filter out signals from an undesired frequency band. Thus, in the context of the exemplary AIMD 20, "signal blocking", "signal filtering", or other similar phrases may mean that the undesired signals are substantially attenuated to the point where they no longer cause any meaningful interference. In other words, even if some portions of the undesired signals gets through one of the circuit networks 325 and 520 discussed above, they may be negligible because their amplitudes are sufficiently small. In various embodiments, the circuit networks 325 and 520 may provide signal attenuations anywhere from about 10 dB to about 100 dB, for example from about 20 dB to about 60 dB.

Referring back to FIG. 2, with the AIMD 20 implanted in body tissue, the external charger 14 of the medical device system 10 is configured to provide electrical power to the AIMD 20. The electrical power may be delivered through an external charging pad 51 containing a transmitting coil 52 (FIGS. 12 to 16). In some embodiments, the external charging pad 51 is a hand-held device that is connected to the external charger 14 by a multiconductor cable which includes (power conductors and control lines). In another embodiment, the external charging pad 51 is an internal component of the external charger 14. The AIMD 20 may also be powered by the previously described electrical power source 30 (FIGS. 3 to 7 and 10) so that it is powered independently of the external charger 14 for a period of time, for example from a day to a month, or longer, depending on the power requirements of the therapeutic electrical stimulation delivered by the AIMD 20.

FIGS. 12 to 16 illustrate that one end 52A of the external transmitting coil 52 is connected to a transmitting circuit 54. An opposite end 52B of the transmitting coil 52 is also connected to the transmitting circuit 54 through a circuit trace (not shown) embedded in a circuit board of the transmitting circuit 54. With both ends of the external transmitting coil 52 connected to the transmitting circuit 54, the external transmitting coil 52 has an appropriate number of turns in order to maximize Q as well as to present an appropriate impedance to the transmitting circuit 54. While a little more than two complete turns of the external transmitting coil 52 about an imaginary center point 56 are shown in the drawings, that is for illustrative purposes. If desired, the external transmitting coil 52 can make one complete turn about the imaginary center point 56 or many more than two turns.

The elongated shape of the AIMD 20 shown in FIGS. 2 to 7 allows the implantation procedure to be performed by injecting or inserting the AIMD into body tissue by the use of an insertion tool, typically through a very small incision. With the AIMD 20 implanted in body tissue and when it is desired to charge the electrical power source 30, the external transmitting coil 52 of the external charger 14 shown in FIG. 2 is moved into close proximity over the skin of the body tissue in which the AIMD 20 is implanted.

FIGS. 12 to 16 are also schematic drawings illustrating the relative positioning of the PCB/inductive charging coil assembly 46 of the AIMD 20 shown in FIGS. 8 and 9, and the external transmitting coil 52 contained in the charging pad 51 connected to the external charger 14 shown in FIG. 2. Considering that the AIMD 20 has a cylindrical shape, it may rotate freely along its longitudinal axis when implanted. This means that the inductive charging coil 48 of the assembly 46 can be positioned parallel to the skin (FIG. 17A) with one of the upper and lower PCB edges 42A and 42B facing the skin (referred to as a 0° position), perpendicular to the skin (FIG. 17B) with one of the upper and lower wind portions 48A and 48B facing the skin (referred to as a 90° position), or at any position in between. In any case, the preferred position is that the longitudinal axis of the AIMD 20 is substantially parallel to the skin of an implant patient with one of the upper and lower PCB edges 42A and 42B facing the skin (the 0° position).

In that respect, it is understood that in the schematic drawings of FIGS. 12 to 16, the AIMD 20 is implanted in body tissue and the external transmitting coil 52 resides outside the body. This means that there is a layer of body tissue including skin between the AIMD 20 and the external transmitting coil 52 and that the distance between the AIMD 20 and the external transmitting coil 52 through body tissue can range from about 4 mm to more than about 55 mm.

In that manner, the external transmitting coil 52 is configured to provide electrical power through body tissue to the inductive charging coil 48 of the AIMD 20. Depending on the orientation of the inductive charging coil 48 of the AIMD 20, FIGS. 12 to 16 illustrate how the external transmitting coil 52 should be positioned with respect to the PCB/inductive charging coil assembly 46 residing inside AIMD 20 to maximize magnetic coupling between the external charger 14 and the inductive charging coil 48 as electrical power is transferred through the body tissue to the inductive charging coil 48 of the AIMD 20.

FIG. 12 shows that when the upper and lower wind portions 48A and 48B of the charging coil 48 are not facing the skin (with the upper or lower PCB edges 42A or 42B facing the transmitting coil 52, either of which could be defined as the 0° position due to symmetry along A-A plane), the optimum relative position is with the assembly 46 being substantially centered on an imaginary center point 56 in the middle of the external transmitting coil 52 winds. This takes benefit of the magnetic flux transmitted by the external transmitting coil 52 being perpendicular to the skin, which is the preferred position for optimum coupling.

FIG. 13 illustrates a relative positioning configuration where one of the upper and lower wind portions 48A and 48B of the charging coil 48 for the PCB/inductive charging coil assembly 46 is facing the skin and is spatially centered between a first, outer wind 52C and a next, inner wind 52D of the external transmitting coil 52. This is the 90° position and maximizes magnetic coupling between the inductive charging coil 48 and the external transmitting coil 52.

As previously discussed, the external transmitting coil 52 can have more than the two winds shown in FIGS. 12 to 16. In that case, with one of the upper and lower wind portions 48A and 48B of the charging coil 48 for the PCB/inductive charging coil assembly 46 facing the skin, optimum position is for the one of the wind portions 48A or 48B being spatially centered between two immediately adjacent winds of the external transmitting coil 52. Again, this is the 90° position described above and maximizes magnetic coupling between the inductive charging coil 48 and the external transmitting coil 52.

FIG. 14 illustrates an imaginary box 58 in dashed lines. Depending on the rotation of the AIMD 20 implanted in body tissue and whether its inductive charging coil 48 is at the 0° position (FIGS. 12 and 17A), the 90° position (FIGS. 13 and 17B), or any angular position between those limits, the optimum position for the external transmitting coil 52 relative to the PCB 42/inductive charging coil 48 assembly 46 is adjusted by moving the transmitting coil 52 relative to the implanted AIMD 20 aligned with the box 58 depending on the angular position of the upper and lower wind portions 48A and 48B of the charging coil 48. In other words, optimum charging efficiency with the upper and lower wind portions 48A and 48B of the inductive charging coil 48 at the 0° position (FIGS. 12 and 17A) is with the assembly 48 centered on the imaginary center point 56 of the external transmitting coil 52 while optimum charging efficiency of the inductive charging coil 48 at the 90° position (FIGS. 13 and 17B) is with the assembly at the other end of the imaginary box 58 and centered between the transmitting coil winds 52C and 52D.

Figure 15:
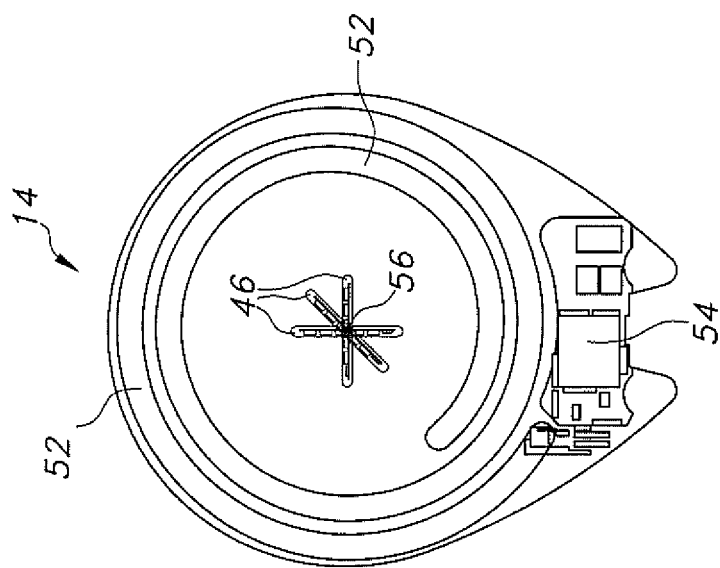

FIG. 15 shows that for the case with the PCB 42/inductive charging coil 48 assembly 46 of the AIMD 20 at the 0° position (or 1800 position depending on which of the upper and lower wind portions 48A and 48B is facing the external transmitting coil 52), the assembly 46 can be substantially centered inside the external transmitting coil 52 winds, aligned at any angle about the imaginary center point 56 for optimum charging efficiency.

Figure 16:
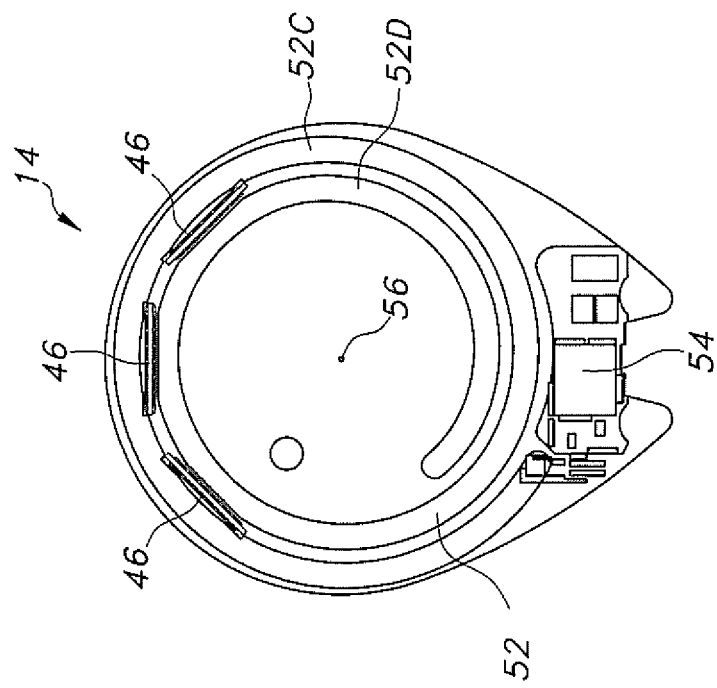

FIG. 16 expands on FIG. 13 for the case with the inductive charging coil 48 at the +90° position or the −90° position (depending on which of the upper and lower PCB edges 42A or 42B is closer to the skin) and shows that the PCB 42/inductive charging coil 48 assembly 46 can be spatially aligned centered between the transmitting coil winds 52C and 52D and at any angle with respect to the imaginary center point of the external transmitting coil 52.

FIG. 18 is a schematic view showing various positions of the PCB/inductive charging coil assembly 46 implanted in body tissue with respect to the transmitting coil 52 contained in an external charging pad 51.

Thus, a method for powering an active implantable medical device (AIMD) according to the present invention comprises providing an active implantable medical device comprising a non-conductive enclosure extending along a first longitudinal axis, a printed circuit board (PCB) assembly comprising a printed circuit board supporting at least one electronic component, wherein the PCB assembly is housed inside the enclosure, a rechargeable electrical power source electrically connected to the PCB assembly, an inductive charging coil that is configured to convert inductive charging signals into inductive energy; and a charging circuit that is configured to convert inductive energy received from the inductive charging coil into a direct current voltage to charge the electrical power source to thereby power the printed circuit board (PCB) assembly.

An external charger is also provided. The external charger comprises an external transmitting coil having at least two winds around a center point of the transmitting coil.

With the AIMD implanted in the body tissue of a patient, the electrical power source powers the printed circuit board (PCB) assembly. Then, when it is determined that the electrical power source needs to be recharged, the external charger is moved across the skin to determine that one of the side wind portions 48C or 48D of the inductive charging coil is at a 0° position facing the skin, that the side wind portions 48C or 48D of the inductive charging coil are at a 90° position perpendicular to the skin, or that the inductive charging coil is at an intermediate position between the 0° position and the 90° position.

With the inductive charging coil at the 90° position, the inductive charging coil is aligned substantially centered between the at least two winds of the external transmitting coil. However, with the inductive charging coil at the 09 position, the inductive charging coil is aligned substantially centered at the center point of the external transmitting coil. Further, with the implanted AIMD aligned at an angle between the 0° position and the 90° position, the relative position of the inductive charging coil with respect to the external transmitting coil is adjusted between the 0° and 90° positions to thereby maximize conversion of inductive energy received from the inductive charging coil by the charging circuit into a direct current voltage to charge the electrical power source.

It is appreciated that various modifications to the inventive concepts described herein may be apparent to those skilled in the art without departing from the spirit and scope of the present invention as defined by the hereinafter appended claims.

What is claimed is:

1. An active implantable medical device (AIMD), comprising:
    a) an elongate, non-conductive enclosure extending along a first longitudinal axis;
    b) a printed circuit board (PCB) assembly housed inside the elongate, non-conductive enclosure, the PCB assembly comprising an elongate PCB extending along a second longitudinal axis and supporting at least one electronic component, wherein the elongate PCB comprises spaced apart upper and lower surfaces that define a PCB thickness and that meet spaced apart first and second relatively long edges, and wherein the upper and lower surfaces and the first and second long edges extend to and meet with opposed third and fourth relatively short ends with the first and second edges spaced from the second longitudinal axis and being longer than the third and fourth ends;
    c) a rechargeable electrical power source electrically connected to the PCB assembly;
    d) an inductive charging coil housed inside the elongate, non-conductive enclosure and being configured to convert inductive charging signals into inductive energy, wherein the inductive charging coil extends along the second longitudinal axis of the PCB and comprises at least one wind of an electrically conductive material, the at least one wind having an upper wind portion residing above the second longitudinal axis and above the upper surface of the PCB, a lower wind portion residing below the second longitudinal axis and below the lower surface of the PCB, and continuous opposed curved wind ends that intersect the second longitudinal axis as they wrap around the opposed third and fourth relatively short ends of the elongate PCB; and
    e) a charging circuit housed inside the elongate, non-conductive enclosure, wherein the charging circuit is configured to convert inductive energy received from the inductive charging coil into a direct current voltage to charge the rechargeable electrical power source to power the PCB assembly.

2. The AIMD of claim 1, wherein the opposed curved wind ends of the inductive charging coil contact the opposed third and fourth relatively short ends of the elongate PCB.

3. The AIMD of claim 1, wherein the opposed curved wind ends of the inductive charging coil extend outwardly past the opposed third and fourth relatively short ends of the elongate PCB.

4. The AIMD of claim 1, wherein the second longitudinal axis is substantially centered midway between the first and second relatively long edges of the elongate PCB.

5. The AIMD of claim 4, wherein, with the PCB assembly housed inside the elongate, non-conductive enclosure, the second longitudinal axis of the elongate PCB is aligned substantially parallel to the first longitudinal axis of the elongate, non-conductive enclosure.

6. The AIMD of claim 4, wherein the inductive charging coil has a width aligned along a winding axis, and wherein the winding axis is perpendicular to the first longitudinal axis of the elongate, non-conductive enclosure and the second longitudinal axis of the elongate PCB.

7. The AIMD of claim 1, wherein the elongate, non-conductive enclosure extends along the first longitudinal axis to opposed proximal and distal open ends, and wherein the rechargeable electrical power source is connected to the elongate, non-conductive enclosure to close the proximal open end thereof.

8. The AIMD of claim 1, further comprising at least a first electrode spaced from a second electrode, wherein the first and second electrodes are electrically connected to the PCB assembly powered by the rechargeable electrical power source.

9. The AIMD of claim 8, wherein the first electrode is connected to the rechargeable electrical power source, spaced from the elongate, non-conductive enclosure.

10. The AIMD of claim 8, wherein the second electrode is connected to the elongate, non-conductive enclosure, spaced from the rechargeable electrical power source, to close the distal open end thereof.

11. The AIMD of claim 1, wherein the at least one component comprising the PCB assembly is a transmitting component that is configured to transmit telemetry signals to an external device.

12. The AIMD of claim 11, wherein the inductive charging coil is configured to receive charging signals in a first frequency band, and wherein the transmitting component is configured to transmit and receive telemetry signals in a second frequency band that is substantially higher than the first frequency band.

13. An active implantable medical device (AIMD), comprising:
    a) an elongate, non-conductive enclosure extending along a first longitudinal axis to opposed proximal and distal open ends;
    b) a printed circuit board (PCB) assembly housed inside the elongate, non-conductive enclosure, the PCB assembly comprising an elongate PCB extending along a second longitudinal axis and supporting at least one electronic component, wherein the elongate PCB comprises spaced apart upper and lower surfaces that define a PCB thickness and that meet spaced apart first and second relatively long edges, and wherein the upper and lower surfaces and the first and second relatively long edges extend to and meet with opposed third and fourth relatively short ends with the first and second long edges spaced from the second longitudinal axis and being longer than the third and fourth short ends;

c) a rechargeable battery connected to the proximal open end of the elongate, non-conductive enclosure, wherein the rechargeable battery is electrically connected to the PCB assembly;
d) an inductive charging coil housed inside the elongate, non-conductive enclosure and being configured to convert inductive charging signals into inductive energy, wherein the inductive charging coil extends along a second longitudinal axis and comprises at least one wind of an electrically conductive material, the at least one wind having an upper wind portion residing above the second longitudinal axis and above the upper surface of the elongate PCB, a lower wind portion residing below the second longitudinal axis and below the lower surface of the elongate PCB, and continuous opposed curved wind ends that intersect the second longitudinal axis and that wrap around the opposed third and fourth relatively short ends of the elongate PCB;
e) a charging circuit housed inside the elongate, non-conductive enclosure, wherein the charging circuit is configured to convert inductive energy received from the inductive charging coil into a direct current voltage to charge the rechargeable battery to power the PCB assembly; and
f) at least a first electrode spaced from a second electrode, wherein the first electrode is connected to the rechargeable battery, spaced from the elongate, non-conductive enclosure, and the second electrode is connected to the distal open end of the elongate, non-conductive enclosure, and wherein the first and second electrodes are electrically connected to the PCB assembly powered by the rechargeable battery.

14. The AIMD of claim 13, wherein the opposed curved wind ends of the inductive charging coil either contact the opposed third and fourth relatively short ends of the elongate PCB or the opposed curved wind ends of the inductive charging coil extend outwardly past the opposed third and fourth relatively short ends of the elongate PCB.

15. The AIMD of claim 13, wherein the second longitudinal axis is substantially centered midway between the first and second relatively long edges of the elongate PCB.

16. The AIMD of claim 15, wherein the inductive charging coil has a width aligned along a winding axis, and wherein the winding axis is perpendicular to the second longitudinal axis of the elongate PCB.

17. A method for powering an active implantable medical device (AIMD), the method comprising the steps of:
a) providing an active implantable medical device (AIMD), comprising:
 i) an elongate, non-conductive enclosure extending along a first longitudinal axis to opposed proximal and distal open ends;
 ii) a printed circuit board (PCB) assembly housed inside the elongate, non-conductive enclosure, the PCB assembly comprising an elongate PCB extending along a second longitudinal axis and supporting at least one electronic component, wherein the elongate PCB has spaced apart upper and lower surfaces that define a PCB thickness and that meet spaced apart first and second relatively long edges, and wherein the upper and lower surfaces and the first and second long edges extend to and meet with opposed third and fourth relatively short ends with the first and second edges spaced from the second longitudinal axis and being longer than the third and fourth ends;
 iii) a rechargeable electrical power source connected to the proximal open end of the elongate non-conductive enclosure, wherein the rechargeable electrical power source is electrically connected to the PCB assembly;
 iv) an inductive charging coil housed inside the elongate, non-conductive enclosure and being configured to convert inductive charging signals into inductive energy, wherein the inductive charging coil extends along the second longitudinal axis and has a width aligned along a winding axis, the winding axis aligned perpendicular to the first and second longitudinal axes, wherein the inductive charging coil comprises at least one wind of an electrically conductive material, the at least one wind having an upper wind portion residing above the second longitudinal axis and above the upper surface of the elongate PCB, a lower wind portion residing below the second longitudinal axis and below the lower surface of the elongate PCB, and continuous opposed curved wind ends that intersect the second longitudinal axis and that wrap around the opposed third and fourth relatively short ends of the elongate PCB;
 v) a charging circuit housed inside the elongate, non-conductive enclosure and being configured to convert inductive energy received from the inductive charging coil into a direct current voltage to charge the rechargeable electrical power source to thereby power the PCB assembly; and
 vi) at least a first electrode spaced from a second electrode, wherein the first electrode is connected to the rechargeable electrical power source, spaced from the elongate, non-conductive enclosure, and the second electrode is connected to the distal open end of the elongate, non-conductive enclosure, and wherein the first and second electrodes are electrically connected to the PCB assembly powered by the rechargeable electrical power source; and
b) providing an external charger comprising an external transmitting coil, wherein the external transmitting coil has at least one wind around a center point of the transmitting coil;
c) implanting the AIMD through the skin and into body tissue of a patient with the rechargeable electrical power source powering the PCB assembly;
d) determining that the rechargeable electrical power source needs to be recharged; and
e) moving the external charger across the skin to determine that:
 i) the inductive charging coil is at a 0° position having one of the spaced apart first and second relatively long edges of the elongate PCB facing the skin,
 ii) the inductive charging coil is at a 90° position with one of the upper and lower wind portions facing the skin, or
 iii) the inductive charging coil is at a −90° position with the other of the upper and lower wind portions facing the skin, and
f) wherein,
 i) when the inductive charging coil is at the 0° position, aligning the external charger so that the center point of the at least one wind of the transmitting coil is aligned with the winding axis of the inductive charging coil, centered about midway between both the opposed third and fourth relatively short ends of the elongate PCB and the opposed curved wind ends of the inductive charging coil, and ii) when the inductive charging coil is at the 90° position with the one of the upper and lower wind portions facing the skin or at the −90° position with the other of the upper and lower wind portions facing the skin, aligning the external charger so that the upper and lower wind portions of the inductive charging coil are substantially centered on the at least one wind of the external transmitting coil, and g) wherein, with the implanted AIMD aligned at any non-orthogonal position that is not the 0° position, the 90° position or the −90° position, adjusting the relative position of the external transmitting coil with respect to the inductive charging coil between the 90° and −90° positions to thereby maximize reception of inductive energy received by the inductive charging coil from the external transmitting coil and to thereby maximize conversion of the received inductive energy by the charging circuit into a direct current voltage to charge the rechargeable electrical power source.

18. The method of claim 17, including providing the opposed curved wind ends of the inductive charging coil contacting the opposed third and fourth relatively short ends of the elongate PCB, or providing the opposed curved wind ends of the inductive charging coil extending outwardly past the opposed third and fourth relatively short ends of the elongate PCB.

19. The method of claim 17, including centering the second longitudinal axis midway between the first and second relatively long edges of the elongate PCB.

20. The method of claim 19, including housing the PCB assembly inside the elongate, non-conductive enclosure and aligning the second longitudinal axis of the elongate PCB substantially parallel to the first longitudinal axis of the elongate, non-conductive enclosure.

21. The method of claim 19, including providing the external transmitting coil of the external charger having at least two winds around the center point of the transmitting coil, and wherein, when the inductive charging coil is at the 90' position with the one of the upper and lower wind portions facing the skin or at the −90° position with the other of the upper and lower wind portions facing the skin, aligning the external charger so that the upper and lower wind portions of the inductive charging coil are substantially centered between the at least two winds of the external transmitting coil.

* * * * *